United States Patent
Rivera et al.

(10) Patent No.: US 10,678,579 B2
(45) Date of Patent: Jun. 9, 2020

(54) POLICY BASED CROSS-CLOUD MIGRATION

(71) Applicant: VMware, Inc., Palo Alto, CA (US)

(72) Inventors: Rawlinson Rivera, Lake Balboa, CA (US); Chen Wei, Milpitas, CA (US); Caixue Lin, Shanghai (CN); Ping Chen, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 163 days.

(21) Appl. No.: 15/462,654

(22) Filed: Mar. 17, 2017

(65) Prior Publication Data

US 2018/0267830 A1 Sep. 20, 2018

(51) Int. Cl.
*G06F 9/48* (2006.01)
*G06F 9/455* (2018.01)
*G06F 9/50* (2006.01)

(52) U.S. Cl.
CPC ........ *G06F 9/45558* (2013.01); *G06F 9/4856* (2013.01); *G06F 9/505* (2013.01); *G06F 9/5072* (2013.01); *G06F 9/5077* (2013.01); *G06F 9/5083* (2013.01); *G06F 2009/4557* (2013.01)

(58) Field of Classification Search
None
See application file for complete search history.

(56) References Cited

U.S. PATENT DOCUMENTS

| 7,673,113 | B2* | 3/2010 | Sugumar | G06F 9/5088 |
| | | | | 711/170 |
| 9,069,599 | B2* | 6/2015 | Martinez | G06F 9/455 |
| 9,183,378 | B2* | 11/2015 | Banerjee | G06F 21/52 |
| 9,189,619 | B2* | 11/2015 | Banerjee | G06F 21/52 |
| 9,218,196 | B2* | 12/2015 | Boss | G06F 9/4862 |
| 9,348,724 | B2* | 5/2016 | Ota | G06F 9/45558 |
| 9,563,463 | B2* | 2/2017 | Innan | G06F 9/5088 |
| 9,594,649 | B2* | 3/2017 | Yang | G06F 11/202 |
| 9,645,628 | B1* | 5/2017 | Loafman | G06F 9/5027 |
| 9,891,946 | B2* | 2/2018 | Bavishi | G06F 9/4856 |
| 2008/0134176 | A1* | 6/2008 | Fitzgerald | G06F 9/45537 |
| | | | | 718/1 |
| 2011/0126047 | A1* | 5/2011 | Anderson | H04L 9/3213 |
| | | | | 714/15 |

(Continued)

OTHER PUBLICATIONS

U.S. Appl. No. 15/195,680, filed Jun. 28, 2016.

*Primary Examiner* — Abu Zar Ghaffari

(74) *Attorney, Agent, or Firm* — Patterson + Sheridan, LLP

(57) ABSTRACT

A policy-driven method of migrating a virtual computing resource that is executing an application workload includes the steps of determining that at least one of multiple policies of the application has been violated by the virtual computing resource while executing the workload in a first virtual data center, and responsive to said determining, programmatically performing: (1) searching for a virtual data center to which the virtual computing resource can be migrated, (2) determining that the virtual computing resource will be able to comply with all of the policies of the application while executing the workload if the virtual computing resource is migrated to the second virtual data center, and (3) based on determining the ability to comply, migrating the virtual computing resource across clouds, namely from the first virtual data center to the second virtual data center.

20 Claims, 6 Drawing Sheets

(56) References Cited

U.S. PATENT DOCUMENTS

| | | | |
|---|---|---|---|
| 2011/0209156 A1* | 8/2011 | Box | G06F 9/5077 718/104 |
| 2011/0276951 A1* | 11/2011 | Jain | G06F 11/3006 717/140 |
| 2011/0307889 A1* | 12/2011 | Moriki | G06F 9/45558 718/1 |
| 2012/0192181 A1* | 7/2012 | Gilbert | G06F 9/45558 718/1 |
| 2013/0042003 A1* | 2/2013 | Franco | H04L 67/1097 709/226 |
| 2013/0152076 A1* | 6/2013 | Patel | G06F 9/45558 718/1 |
| 2013/0247045 A1* | 9/2013 | Fitzgerald | G06F 9/455 718/1 |
| 2013/0311988 A1* | 11/2013 | Boss | G06F 9/4862 718/1 |
| 2014/0237537 A1* | 8/2014 | Manmohan | G06F 21/53 726/1 |
| 2015/0058384 A1 | 2/2015 | Karamanolis et al. | |
| 2015/0128131 A1* | 5/2015 | Cao | G06F 9/4856 718/1 |
| 2015/0261578 A1* | 9/2015 | Greden | G06F 9/5044 718/1 |
| 2016/0036893 A1* | 2/2016 | Pomerantz | H04L 47/70 709/201 |
| 2016/0055023 A1* | 2/2016 | Ghosh | G06F 9/45558 718/1 |
| 2016/0266919 A1* | 9/2016 | Wang | G06F 9/4856 |
| 2017/0034274 A1* | 2/2017 | Hanney | H04L 67/1097 |
| 2017/0060628 A1 | 3/2017 | Tarasuk-Levin et al. | |
| 2017/0147399 A1* | 5/2017 | Cropper | G06F 9/4856 |
| 2017/0171157 A1* | 6/2017 | Hristov | H04L 63/0272 |

* cited by examiner

Blueprint for Multi-tiered application
108A

| VM | CPU | Memory | Network | IOPS | Latency |
|----|---------|--------|----------|------|---------|
| 0  | 4 cores | 2 GB   | 50 Gbps  | min1 | max1    |
| 1  | 2 cores | 1 GB   | 50 Gbps  | min2 | max2    |
| 2  | 4 cores | 2 GB   | 100 Gbps | min3 | max3    |
| ... | ...    | ...    | ...      | ...  | ...     |

Other Requirements
1. Virtual_SAN = yes
2. NSX = yes
3. Thin provisioning = off
4. Encryption = on

FIGURE 4A

Blueprint for Multi-tiered application
108B

| VM | CPU | Memory | Network | Storage | Security |
|---|---|---|---|---|---|
| 0 | Medium_CPU | Medium_Memory | NSX_VTEP | Guaranteed_IOPS | Prod_App |
| 1 | High_CPU | High_Memory | NSX_VTEP | Millisecond_Latency | Prod_Database |
| ... | ... | ... | ... | ... | ... |

Medium_CPU:
    CPU.Number=2
High_CPU:
    CPU.Number=4
Medium_Memory:
    Memory.SizeInMB=4
High_Memory:
    Memory.SizeInMB=16
NSX_VTEP:
    Network.Type=NSX && Network.VTEP=true
Guaranteed_IOPS:
    If Storage.Type=EMC-VMAX, EMC.IOPS<=10000&&EMC.IOPS>=8000;
    If Storage.Type=Dell-Compellent, Storage.Tag="Guaranteed IOPS";
Millisecond_Latency:
    If Storage.Type=Virtual_SAN-Hybrid, VSAN.HYBRID_LATENCY<=5;
    If Storage.Type=Dell-Compellent, Storage.Tag="Millisecond Latency";
Prod_App:
    SecurityGroup=L3-Pre-Prod-App
Prod_Database:
    SecurityGroup=L3-Pre-Prod-Database

FIGURE 4B

POLICY BASED CROSS-CLOUD MIGRATION

BACKGROUND

An enterprise user of virtualization computer systems, over time, may use a number of heterogeneous cloud infrastructures, including private clouds, public clouds, and hybrid clouds. This may be because of acquisitions, technology refresh, or price reasons. However, each cloud infrastructure comes with its own service capabilities. Managing such multiple heterogeneous cloud infrastructures is difficult, as the service capabilities will widely differ in terms of hardware architectures (compute, storage, network, storage, etc.) and services offered.

As a consequence, in a multi-cloud infrastructure, there is no consistent way for application authors to demand a certain level of performance based on required characteristics, e.g., input/output (IO) latency, input/output operations per second (IOPS), etc., or to ask for the data to be always encrypted. Conventionally, the way to solve such a problem is to design and implement fixed infrastructure resources and capabilities based on each service level offered by the different cloud infrastructures. The management, consumption, and mapping of all the service levels are done manually or using a semi-automated scheme that relies on inventory systems or spreadsheets. While the conventional solution may work for initial placement, making sure the requirements are being met over the lifetime of the application is much more complicated. Moving an application across clouds is possible today but it is something that is performed manually and introduces outages and application service disruption.

SUMMARY

According to embodiments, an application workload is migrated to a different managed cloud infrastructure in order to satisfy the requirements of the application without potential outage and service disruption. The application dependencies, as well as the cloud infrastructure and service requirements, are automatically validated prior to the migration. Embodiments provide the ability to systematically migrate the application across cloud infrastructures based on infrastructure capabilities and application policies throughout the lifetime of an application.

A policy-driven method of migrating a virtual computing resource that is executing a workload of an application, according to an embodiment, comprises determining that at least one of multiple policies of the application has been violated by the virtual computing resource while executing the workload in a first virtual data center, and responsive to said determining, programmatically performing the steps of: (1) searching for a virtual data center to which the virtual computing resource can be migrated, (2) determining that the virtual computing resource will be able to comply with all of the policies of the application while executing the workload if the virtual computing resource is migrated to the second virtual data center, and (3) based on determining the ability to comply, migrating the virtual computing resource from the first virtual data center to the second virtual data center.

Further embodiments include, without limitation, a non-transitory computer-readable medium that includes instructions that enable a processor to implement one or more aspects of the above method as well as a computer system having a processor, memory, and other components that are configured to implement one or more aspects of the above method.

BRIEF DESCRIPTION OF THE DRAWINGS

FIGS. 4A and 4B are each a sample application blueprint that defines policies of an application.

DETAILED DESCRIPTION

Figure 1:
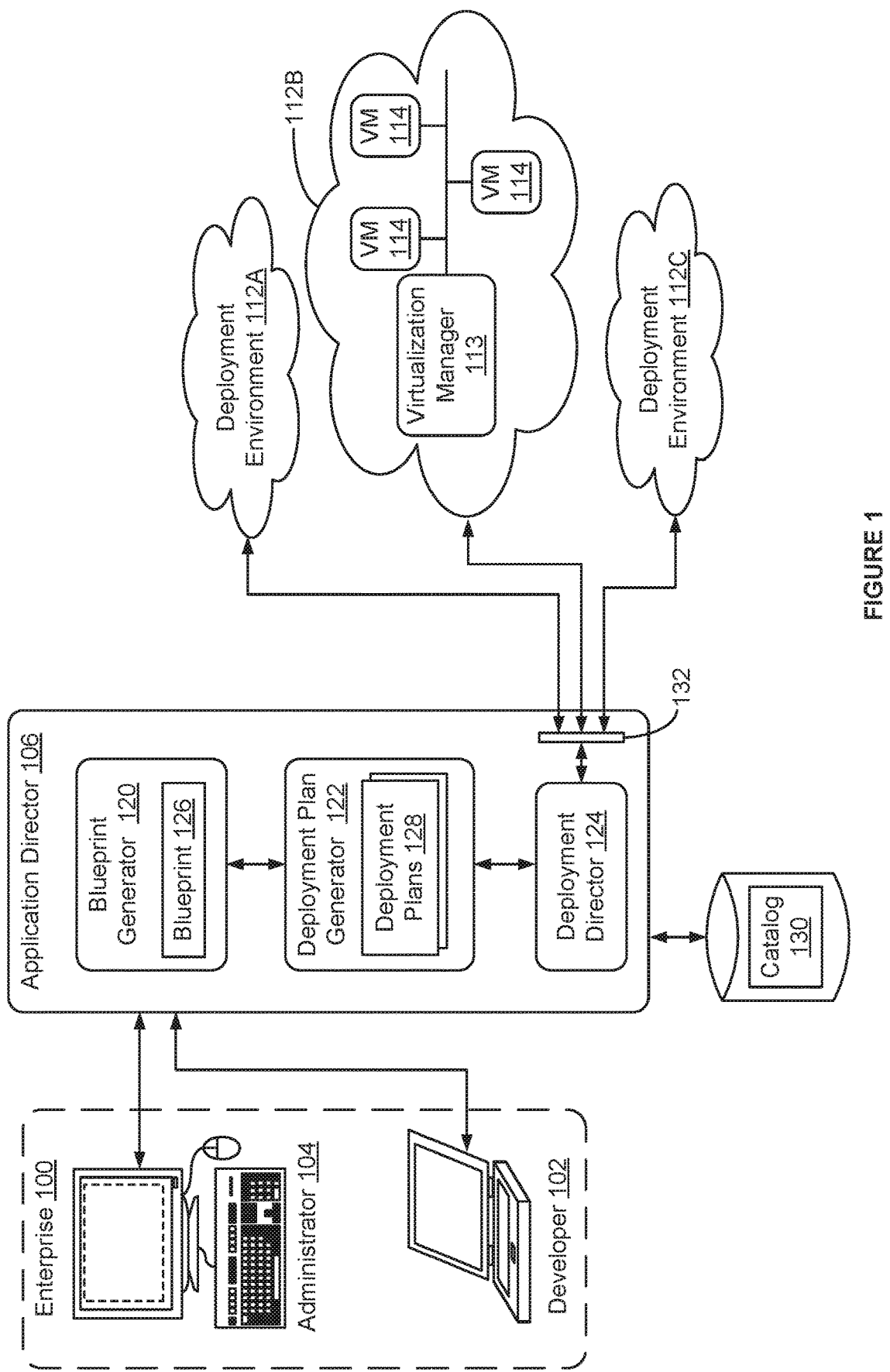
FIG. 1 depicts one embodiment of a system for deploying an application on multiple cloud computing environments.

FIG. 1 depicts a system for deploying an application on multiple cloud computing environments. In this embodiment, a multi-tier application created by developer 102 is being deployed for enterprise 100 in a deployment environment. The deployment environment may be a private cloud, a public cloud, or a hybrid private/public cloud, and is depicted in FIG. 1 as deployment environments 112A, 112B, 112C. As used herein, a "private" cloud is a cloud in which a tenant and a cloud service provider are part of the same organization, while a "public" cloud is a cloud that is provided by an organization that is separate from a tenant that accesses the public cloud. A hybrid cloud is a cloud architecture in which a tenant is provided with seamless access to both private cloud resources and public cloud resources.

Enterprise 100 may access services from each of the deployment environments, for example, via REST (Representational State Transfer) APIs (Application Programming Interface) or any other client-server communication protocol. Each deployment environment 112 includes virtual computing resources (e.g., virtual machines or VMs 114, or containers) in which enterprise 100 can deploy its multi-tier application.

A developer 102 of enterprise 100 uses an application director 106, which may be running in one or more VMs, to orchestrate deployment of a multi-tier application 108 onto one of deployment environments 112. As illustrated, application director 106 includes the following software modules: a blueprint generator 120, a deployment plan generator 122, and a deployment director 124. Blueprint generator 120 generates a blueprint 126 that specifies service requirements (hereinafter referred to as "policies") of the application 108 to be deployed. Blueprint 126 generally captures the structure of an application 108 as a collection of application components executing on virtual computing resources. For example, blueprint 126 generated by application director 106 for an online store application may specify a web application (e.g., in the form of a Java web application archive or "WAR" file comprising dynamic web pages, static web pages, Java servlets, Java classes, and other property, configuration and resources files that make up a Java web application) executing on an application server (e.g., Apache Tomcat application server) and that uses as a database (e.g., MongoDB) as a data store. It is noted that the term "application" is used herein to generally refer to a logical deployment unit, comprised of application packages and their dependent middleware and operating systems. As such, in the example described above, the term "application" refers to the entire online store application, including application server and database components, rather than just the web application itself.

Blueprint 126 may be assembled out of items from a catalog 130, which is a listing of available infrastructure resources (e.g., processor, memory, networking, storage, etc.) that may support provisioning of virtual computing resources in deployment environments and available application components (e.g., software services, scripts, code components, application-specific packages) that may be installed on the provisioned virtual computing resources. Catalog 130 may be pre-populated and customized by an administrator 104 (e.g., IT or system administrator) that enters in specifications, configurations, properties, and other details about each item in catalog 130. Blueprint 126 may define one or more dependencies between application components to indicate an installation order of the application components during deployment. For example, since a load balancer usually cannot be configured until a web application is up and running, developer 102 may specify a dependency from an Apache service to an application code package.

Deployment plan generator 122 of application director 106 generates a deployment plan 128 based on blueprint 126 that includes deployment settings for blueprint 126 (e.g., virtual computing resources' cluster size, CPU, memory, networks) and an execution plan of tasks having a specified order in which virtual computing resources are provisioned and application components are installed, configured, and started. Deployment plan 128 provides an IT administrator with a process-oriented view of blueprint 126 that indicates discrete steps to be performed to deploy application 108. Different deployment plans 128 may be generated from a single blueprint 126 to test prototypes (e.g., new application versions), to scale-up and scale down deployments, or deploy application 108 to different deployment environments 112 (e.g., testing, staging, production).

Deployment director 124 of application director 106 communicates with virtualization managers of deployment environments 112 (e.g., virtualization manager 113) via a cloud interface 132 to determine service capabilities thereof and to select a deployment environment that can satisfy the policies of the application defined in blueprint 126. Upon selection, deployment director 124 of application director 106 executes deployment plan 128 by communicating with the virtualization manager of the selected deployment environment via cloud interface 132 to provision and configure VMs 114 in the selected deployment environment, as specified by deployment plan 128. Cloud interface 132 provides a communication abstraction layer by which application director 106 may communicate with the virtualization managers of deployment environments 112.

Deployment director 124 provides each VM 114 with a series of tasks specific to the receiving VM 114 (herein referred to as a "local deployment plan"). The tasks may be scripts that are executed by VMs 114 to install, configure, and/or start one or more application components. For example, a task may be a script that, when executed by a VM 114, causes VM 114 to retrieve and install particular software packages from a central package repository 134. Deployment director 124 coordinates with VMs 114 to execute the tasks in an order that observes installation dependencies between VMs 114 according to deployment plan 128. After application 108 has been deployed, application director 106 may be utilized to monitor and modify (e.g., scale) the deployment.

Figure 2:
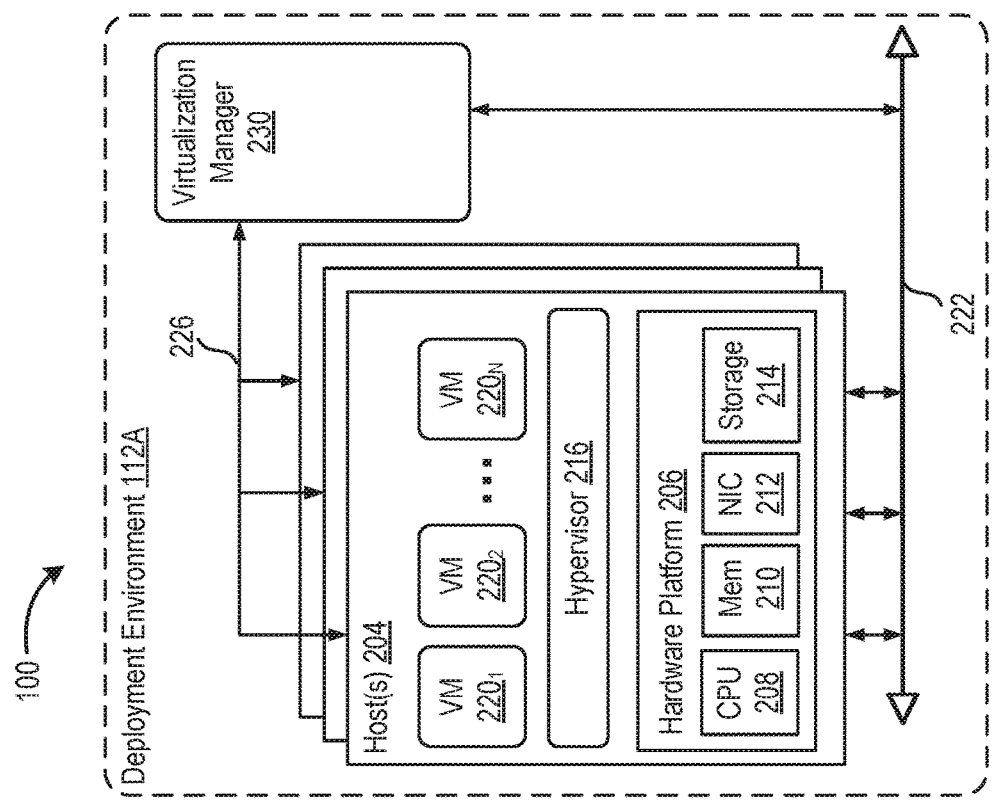
FIG. 2 is a block diagram of a virtual data center provisioned in a private cloud computing environment.

In one embodiment, one of deployment environments 112, e.g., deployment environments 112A, is a virtual data center provisioned from a private cloud. FIG. 2 is a block diagram of deployment environment 112A according to this embodiment.

Deployment environment 112A includes one or more host computer systems ("hosts 204"). Hosts 204 may be constructed on a server grade hardware platform 206, such as an x86 architecture platform. As shown, hardware platform 206 of each host 204 may include conventional components of a computing device, such as one or more processors (CPUs) 208, system memory 210, a network interface 212, storage system 214, and other I/O devices such as, for example, a mouse and keyboard (not shown). CPU 208 is configured to execute instructions, for example, executable instructions that perform one or more operations described herein and may be stored in memory 210 and in local storage. Memory 210 is a device allowing information, such as executable instructions, cryptographic keys, configurations, and other data, to be stored and retrieved. Memory 210 may include, for example, one or more random access memory (RAM) modules. Network interface 212 enables host 204 to communicate with another device via a communication medium, such as a network 222 within deployment environment 112A. Network interface 212 may be one or more network adapters, also referred to as a Network Interface Card (NIC). Storage system 214 represents local storage devices (e.g., one or more hard disks, flash memory modules, solid state disks, and optical disks) and/or a storage interface that enables host 204 to communicate with one or more network data storage systems. Examples of a storage interface are a host bus adapter (HBA) that couples host 204 to one or more storage arrays, such as a storage area network (SAN) or a network-attached storage (NAS), as well as other network data storage systems.

Each host 204 is configured to provide a virtualization layer that abstracts processor, memory, storage, and networking resources of hardware platform 206 into multiple virtual machines $220_1$ to $220_N$ (collectively referred to as VMs 220) that run concurrently on the same hosts. VMs 220 run on top of a software interface layer, referred to herein as a hypervisor 216, that enables sharing of the hardware resources of host 204 by VMs 220. Hypervisor 216 may run on top of the operating system of host 204 or directly on hardware components of host 204.

Deployment environment 112A includes a virtualization management component (depicted in FIG. 2 as virtualization manager 230) that may communicate with the plurality of hosts 204 via a network, sometimes referred to as a management network 226. In one embodiment, virtualization manager 230 is a computer program that resides and executes in a central server, which may reside in deployment environment 112A, or alternatively, running as a VM in one of hosts 204. Virtualization manager 230 is configured to carry out administrative tasks for deployment environment 112A, including managing hosts 204, managing VMs 220 running within each host 204, provisioning VMs, migrating VMs from one host to another host, and load balancing between hosts 204.

In one embodiment, storage system 214 is a virtual storage area network (virtual SAN), such as the one described in U.S. patent application Ser. No. 14/010,293, filed Aug. 26, 2013 and entitled "Scalable Distributed Storage Architecture," the entire contents of which are incorporated by reference herein. Virtual SAN leverages the commodity local storage housed in or directly attached to hosts 204 to provide an aggregate object store to VMs 220 running on the hosts.

The network for deployment environment 112A may be a physical network or a virtual network, such as the one that implements the VMware NSX® network virtualization technology. Such a virtual network instantiates all network services such as layer 2 switching, L3 routing, load balancing and firewall services within a logical space, through a network virtualization layer, implemented in hypervisor 216, that abstracts the underlying networking hardware. A virtual network management component running in virtualization manager 230 carries out the provisioning and the management of this virtual network.

Figure 3:
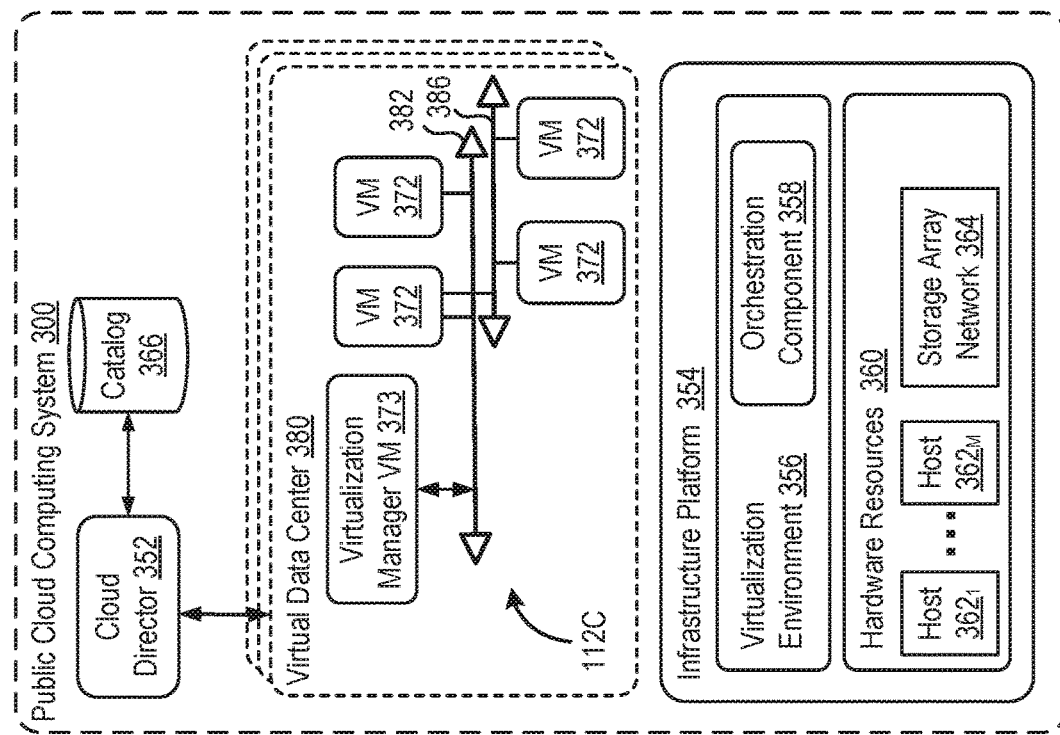
FIG. 3 is a block diagram of a virtual data center provisioned in a public cloud computing environment.

One of deployment environments 112, e.g., deployment environment 112C, may be a virtual data center provisioned in a public cloud computing system 300. FIG. 3 is a block diagram of public cloud computing system 300 in which virtual data center 380 is provisioned as deployment environment 112C.

Public cloud computing system 300 is configured to dynamically provide an enterprise (or users of an enterprise) with one or more virtual data centers in which a user may deploy multi-tier applications on VMs and/or execute workloads. FIG. 3 depicts virtual data center 380 in which VMs 372 are provisioned to support multi-tier applications (e.g., multi-tier application 108). Virtual data center 380 also includes a VM 373 that hosts the virtualization manager for virtual data center 380.

Public cloud computing system 300 includes an infrastructure platform 354 that supports virtual data center 380. In the particular embodiment of FIG. 3, infrastructure platform 354 includes hardware resources 360 having computing resources (e.g., hosts $362_1$ to $362_N$), storage resources (e.g., one or more storage array systems, such as SAN 364 or virtual SAN), and networking resources, which are configured in a manner to provide a virtualization environment 356 that supports the execution of a plurality of virtual machines 372 across hosts 362. It is recognized that hardware resources 360 of public cloud computing system 300 may in fact be distributed across multiple data centers in different locations.

In one embodiment, virtualization environment 356 includes an orchestration component 358 (e.g., implemented as a process running in a VM) that provides infrastructure resources to virtual data center 380 responsive to provisioning requests. For example, if an enterprise required a specified number of virtual machines to deploy a web application or to modify (e.g., scale) a currently running web application to support peak demands, orchestration component 358 can initiate and manage the instantiation of virtual machines (e.g., VMs 372) on hosts 362 to support such requests. In one embodiment, orchestration component 358 instantiates virtual machines according to a requested template that defines one or more virtual machines having specified virtual computing resources (e.g., compute, networking, storage resources). Further, orchestration component 358 monitors the infrastructure resource consumption levels and requirements of virtual data center 380 and provides additional infrastructure resources to virtual data center 380 as needed or desired.

In one embodiment, public cloud computing system 300 may include a cloud director 352 (e.g., running in one or more virtual machines) that manages allocation of virtual computing resources to an enterprise for deploying applications. Cloud director 352 may be accessible to users via a REST (Representational State Transfer) API (Application Programming Interface) or any other client-server communication protocol. Cloud director 352 may authenticate connection attempts from the enterprise using credentials issued by the cloud computing provider. Cloud director 352 maintains and publishes a catalog 366 of available virtual machine templates and packaged virtual machine applications that represent virtual machines that may be provisioned in virtual data center 380. Cloud director 352 receives provisioning requests submitted (e.g., via REST API calls) and may propagates such requests to orchestration component 358 to instantiate the requested virtual machines (e.g., VMs 372).

Referring back to FIG. 1, prior to deployment of multi-tier application 108, application director 106 generates blueprint 126 for multi-tier application 108 in response to user (e.g., developer 102) inputs. In one implementation, developer 102 may utilize a graphical user interface provided by application director 106 to assemble and arrange items from catalog 130 into a topology that represents virtual computing resources and application components for supporting execution of application 108. Blueprint 126 includes a logical topology of virtual computing resources and application components for supporting the application, and policies (also referred to herein as "requirements") for the application as defined by the user. The policies specified in blueprint 126 for an application generally include compute, storage, network, security services, data services, and performance capabilities.

In the example shown in FIG. 4A, the blueprint for multi-tiered application 108A specify the minimum number of CPU cores, minimum amount of memory, minimum network speed, minimum IOPS and maximum IO latency for each of the VMs that will be deployed in a deployment environment to execute multi-tiered application 108A. According to this blueprint, multi-tiered application 108A also requires that the deployment environment be capable of supporting virtual SAN, NSX, and encryption. By contrast, thin provisioning is not a requirement of multi-tiered application 108A specified in the blueprint.

In the example shown in FIG. 4B, the blueprint for multi-tiered application 108B specify the CPU, memory, network, storage, and security policies in a more flexible manner.

The CPU policy specifies different requirements for the number of CPU cores. Two CPU policy examples are given in FIG. 4B. The Medium_CPU policy requires at least two CPU cores and the High_CPU policy requires at least four CPU cores.

The memory policy specifies different requirements for the memory size. Two memory policy examples are given in FIG. 4B. The Medium_Memory policy requires at least 4 MB and the High_Memory policy requires at least 16 MB.

The network policy specifies different requirements for the network. One network policy example is given in FIG. 4B. The NSX_VTEP policy requires the network type to be NSX and requires VXLAN tunnel endpoints (VTEPs) to perform frame encapsulation, where VXLAN Virtual Extensible LAN (VXLAN) is an encapsulation protocol for running an overlay network on existing layer-3 infrastructure.

The storage policy specifies different requirements for the storage. Two storage policy examples are given in FIG. 4B. The Guaranteed_IOPS policy requires a certain minimum TOPS to be provided by the storage. The guaranteed TOPS is set differently for different storage types. For example, if the storage type is EMC-VMAX, the guaranteed TOPS is greater than or equal to 8000 and less than or equal to 10000.

On the other hand, if the storage type is Dell-Compellent, the guaranteed TOPS is set according to the value of the storage tag "Guaranteed TOPS." The Millisecond_Latency policy requires a certain maximum latency (in milliseconds) to be provided by the storage. The maximum latency is set differently for different storage types. For example, if the storage type is Virtual_SAN-Hybrid, the maximum latency is 5 milliseconds. On the other hand, if the storage type is Dell-Compellent, the maximum latency is set according to the value of the storage tag "Millisecond Latency."

The security policy specifies different requirements for security. Two security policy examples are given in FIG. 4B. The Prod_App policy requires the L3-Pre-Prod-App security group to be applied to VM0. The Prod_Database policy requires the L3-Pre-Prod-Database security group to be applied to VM1. According to embodiments, a VM will not be deployed in or migrated to a virtual data center that does have the required security group for that VM.

Figure 5:
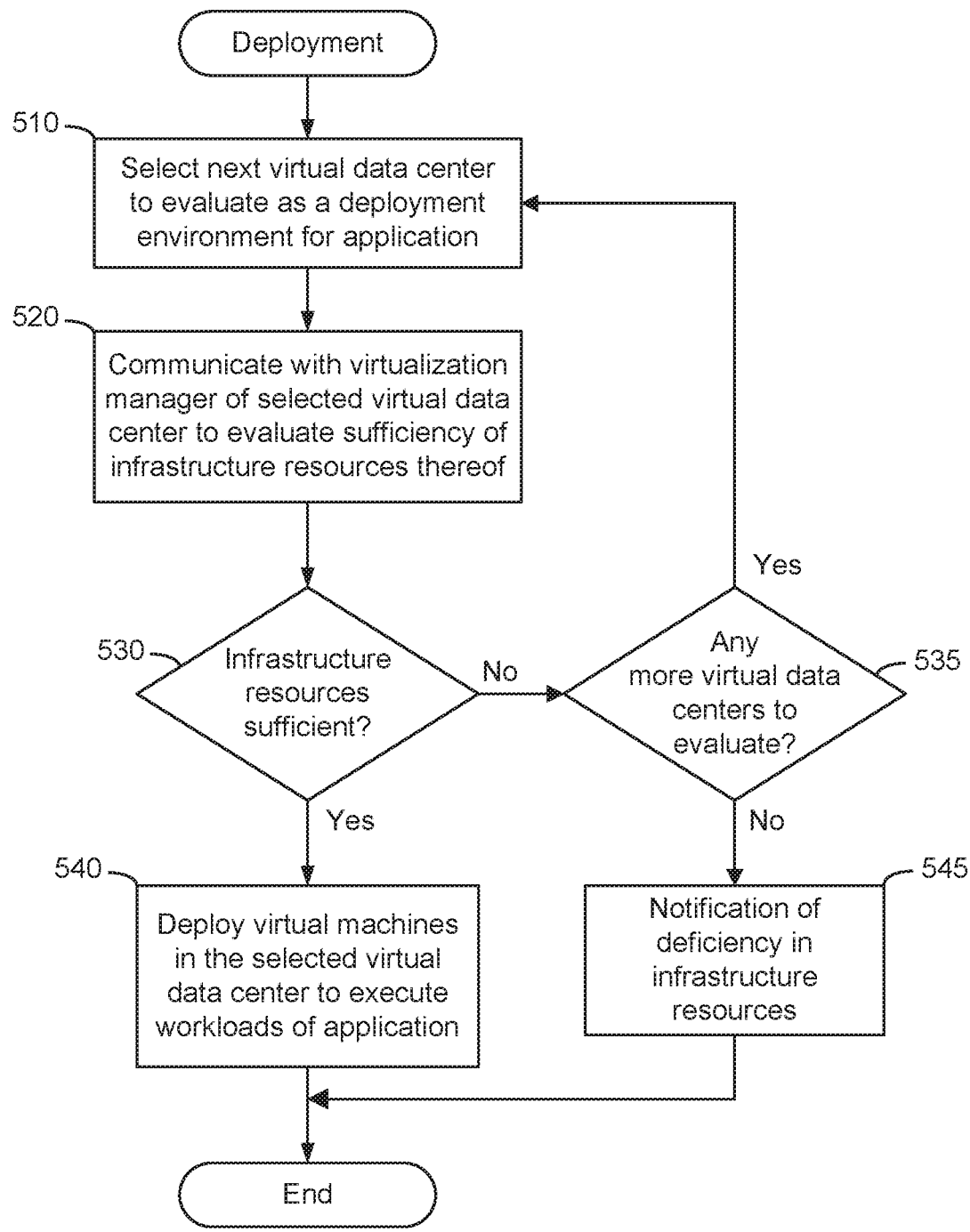
FIG. 5 is a flow diagram that illustrates a method of deploying virtual machines in a virtual data center to execute workloads of the application.

FIG. 5 is a flow diagram that illustrates a method of deploying virtual machines in a virtual data center to execute workloads of the application. This method is carried out by deployment director 124 after blueprint 126 (e.g., the blueprint for multi-tiered application 108A or 108B) has been generated, and begins with step 510.

At step 510, deployment director 124 selects one of deployment environments, for example, virtual data centers provisioned in private, public, or hybrid clouds, to evaluate as a potential deployment environment for the multi-tiered application. Then, at step 520, deployment director 124 communicates with the virtualization manager of the selected virtual data center to evaluate whether or not infrastructure resources available at the selected virtual data center will be sufficient to meet the requirements of the multi-tiered application. The test for sufficiency is carried out at step 530.

If deployment director 124 determines at step 530 that the infrastructure resources available at the selected virtual data center is sufficient, the flow proceeds to step 540, where deployment director 124 communicates with the virtualization manager of the selected virtual data center to provision VMs to execute workloads of the multi-tiered application. As part of the deployment, the policies of the application specified in blueprint 126 are transmitted to the virtualization manager of the selected virtual data center and stored locally by the virtualization manager. On a periodic basis, the virtualization manager checks to see if there are any violations of any of the policies. If there are any violations, the virtualization manager generates a compliance event which notifies deployment director 124 of the policy violation. On the other hand, if deployment director 124 determines at step 530 that the infrastructure resources available at the selected virtual data center is not sufficient, the flow proceeds to the decision block of step 535.

At step 535, deployment director 124 determines whether or not there are any other virtual data centers to evaluate as a potential deployment environment for the multi-tiered application. If there is, the flow returns to step 510 and deployment director 124 executes steps 510, 520, and 530 again. If there are no more virtual data centers to evaluate as a potential deployment environment for the multi-tiered application, deployment director 124 issues a notification of deficiency in infrastructure resources at step 545. The notification serves as a prompt for the user to redefine the requirements of the multi-tiered application in blueprint 126, in particular to make the requirements less stringent.

Figure 6:
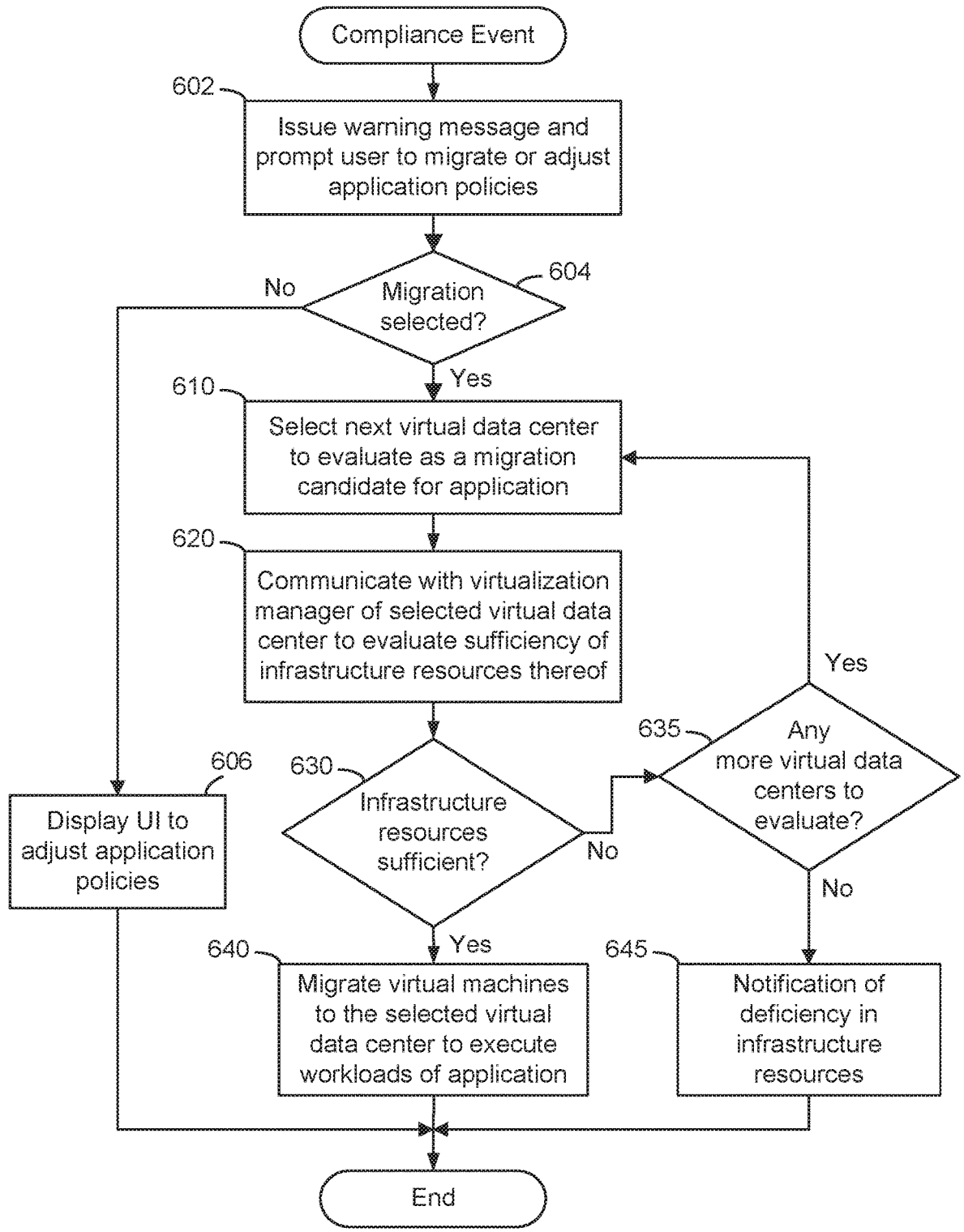
FIG. 6 is a flow diagram that illustrates a method of migrating virtual machines to a virtual data center to execute workloads of the application.

FIG. 6 is a flow diagram that illustrates a method of migrating virtual machines to a virtual data center to execute workloads of the multi-tiered application. This method is carried out by deployment director 124 in response to a compliance event. The compliance event is generated by the virtualization manager of the virtual data center when the virtualization manager detects a violation of one of the policies of the multi-tiered application. The compliance event may also be generated if the user changes one or more policies of the application, and one of the changed policies is violated.

At step 602, the user is notified through deployment director 124 that a policy or policies of the application has been violated. At this point, the user is given the option of changing the one or more policies of the application to bring the execution of the application back into compliance or the option of migrating the application to a compliant virtual data center. If migration option is selected as determined at step 604, deployment director 124 executes steps 610, 620, 630, and 635 in a loop in the same manner as it executed 510, 520, 530, and 535 until it is able to find a compliant virtual data center. Upon finding a compliant virtual data center, deployment director 124 at step 640 migrates the virtual machines that are executing the workloads of the application to the compliant virtual data center. As for the technique for migration, live migration is used so that there is no service disruption. The application dependencies among the migrated virtual machines are also preserved during the migration. Various cross-cloud migration techniques may be used. In one embodiment, the cross-cloud migration technique described in U.S. patent application Ser. No. 14/839,350, filed on Aug. 28, 2015, entitled "Virtual Machine Migration Within a Hybrid Cloud System," the entire contents of which are incorporated by reference herein, is used. In another embodiment, the cross-cloud migration technique described in U.S. patent application Ser. No. 15/195,680, filed on Jun. 28, 2016, entitled "Cross-Cloud Provider Virtual Machine Migration," the entire contents of which are incorporated by reference herein, is used.

If there are no more virtual data centers to evaluate as a potential migration destination for the multi-tiered application, deployment director 124 issues a notification of deficiency in infrastructure resources at step 645. The notification serves as a prompt for the user to redefine the requirements of the multi-tiered application in blueprint 126, in particular to make the requirements less stringent.

Returning back to step 604, if the migration option is not selected, the flow proceeds to step 606, where the user interface is displayed to the user for the user to adjust the policies of the multi-tiered application.

After step 606, and also after steps 545 and 645, if the user adjusts policies of the multi-tiered application, the adjusted policies are communicated to the virtualization manager of the virtual data center in which virtual machines for the multi-tiered application are deployed. The virtualization manager maintains the adjusted policies in local storage and evaluates them periodically for compliance. If the virtualization manager detects another violation, a compliance event is generated and the method of FIG. 6 is executed again. As a result, automatic migration between virtual data centers provisioned in different clouds, and thus automatic migration between clouds, is triggered according to embodiments.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A policy-driven method of migrating a virtual computing resource that is executing a workload of an application, said method comprising:

determining that at least one of multiple policies defined for the application with respect to the virtual computing resource executing the workload of the application has been violated while executing the workload in the virtual computing resource in a first virtual data center provisioned on a first computing system comprising a plurality of host computing devices, wherein the at least one of the multiple policies defines, for the virtual computing resource while executing the workload of the application, at least one of a minimum number of processor cores for use by the virtual computing resource, a minimum amount of memory for use by the virtual computing resource, a minimum network speed for use by the virtual computing resource, a minimum input/output operations per second (IOPS) for use by the virtual computing resource, a maximum input/ output (TO) latency for use by the virtual computing resource, or a security policy to be applied to the virtual computing resource while executing the workload of the application; and responsive to said determining, programmatically performing steps including: (1) searching for a second virtual data center to which the virtual computing resource executing the workload can be migrated, (2) determining that, if the virtual computing resource executing the workload is migrated from the first virtual data center to the second virtual data center provisioned on a second computing system comprising a plurality of host computing devices, then all of the multiple policies defined for the application will be complied with, and (3) based on the determined ability to comply, migrating the virtual computing resource executing the workload from the first virtual data center to the second virtual data center.

2. The method of claim 1, wherein the searching is limited to virtual data centers that have network virtualization enabled as a networking feature thereof.

3. The method of claim 1, wherein the searching is limited to virtual data centers that have virtual storage area network enabled as a storage feature thereof.

4. The method of claim 1, wherein a policy violation is determined as a result of a decrease, at the virtual computing resource, in at least one of a number of processor cores, an amount of memory, a network speed, or an TOPS.

5. The method of claim 1, wherein a policy violation is determined as a result of a removal or an update, at the first virtual data center, of at least one of a network, storage, or security feature.

6. The method of claim 1, further comprising:
during initial deployment of the application, programmatically performing steps including (1) searching for the first virtual data center in which the virtual computing resource that executes the workload can be deployed, (2) determining that, if the virtual computing resource that executes the workload is deployed in the first virtual data center, then all of the multiple policies defined for the application will be complied with, and (3) based on the determined ability to comply, deploying the virtual computing resource that executes the workload in the first virtual data center.

7. The method of claim 1, wherein the first computing system is a private cloud computing system and the second computing system is a multi-tenant public cloud computing system.

8. The method of claim 1, wherein the virtual computing resource is one of multiple virtual machines that execute workloads of the application, wherein the application is a multi-tier application.

9. The method of claim 1, wherein said searching includes determining that, if the virtual computing resource executing the workload is migrated to any one of one or more virtual data centers other than the first virtual data center and the second virtual data center, then not all of the multiple policies defined for the application will be complied with.

10. A non-transitory computer readable medium comprising instructions for causing a computer system that is executing the instructions to carry out a policy-driven method of migrating a virtual computing resource that is executing a workload of an application, said method comprising:

determining that at least one of multiple policies defined for the application with respect to the virtual computing resource executing the workload of the application has been violated while executing the workload in the virtual computing resource in a first virtual data center provisioned on a first computing system comprising a plurality of host computing devices, wherein the at least one of the multiple policies defines, for the virtual computing resource while executing the workload of the application, at least one of a minimum number of processor cores for use by the virtual computing resource, a minimum amount of memory for use by the virtual computing resource, a minimum network speed for use by the virtual computing resource, a minimum input/output operations per second (IOPS) for use by the virtual computing resource, a maximum input/output (TO) latency for use by the virtual computing resource, or a security policy to be applied to the virtual computing resource while executing the workload of the application; and responsive to said determining, programmatically performing steps including: (1) searching for a second virtual data center to which the virtual computing resource executing the workload can be migrated, (2) determining that, if the virtual computing resource executing the workload is migrated from the first virtual data center to the second virtual data center provisioned on a second computing system comprising a plurality of host computing devices, then all of the multiple policies defined for the application will be complied with, and (3) based on the determined ability to comply, migrating the virtual computing resource executing the workload from the first virtual data center to the second virtual data center.

11. The non-transitory computer readable medium of claim 10, wherein the searching is limited to virtual data centers that have network virtualization enabled as a networking feature thereof.

12. The non-transitory computer readable medium of claim 10, wherein the searching is limited to virtual data centers that have virtual storage area network enabled as a storage feature thereof.

13. The non-transitory computer readable medium of claim 10, wherein a policy violation is determined as a result of a decrease, at the virtual computing resource, in at least one of a number of processor cores, an amount of memory, a network speed, or an TOPS.

14. The non-transitory computer readable medium of claim 10, wherein a policy violation is determined as a result of a removal or an update, at the first virtual data center, of at least one of a network, storage, or security feature.

15. The non-transitory computer readable medium of claim 10, wherein the method further comprises:
during initial deployment of the application, programmatically performing steps including (1) searching for the first virtual data center in which the virtual computing resource that executes the workload can be deployed, (2) determining that, if the virtual computing resource that executes the workload is deployed in the first virtual data center, then all of the multiple policies defined for the application will be complied with, and (3) based on the determined ability to comply, deploying the virtual computing resource that executes the workload in the first virtual data center.

16. The non-transitory computer readable medium of claim 10, wherein the first computing system is a private cloud computing system and the second computing system is a multi-tenant public cloud computing system.

17. The non-transitory computer readable medium of claim 10, wherein the virtual computing resource is one of multiple virtual machines that execute workloads of the application, wherein the application is a multi-tier application.

18. The non-transitory computer readable medium of claim 10, wherein said searching includes determining that, if the virtual computing resource executing the workload is migrated to any one of one or more virtual data centers other than the first virtual data center and the second virtual data center, then not all of the multiple policies defined for the application will be complied with.

19. A computer system for managing a policy-driven method of migrating a virtual computing resource that is executing a workload of an application, said computer system comprising:
a storage device in which a blueprint of the application is stored, the blueprint including policies defined for the application; and
a processor programmed to:
determine that at least one of the policies defined for the application with respect to the virtual computing resource executing the workload of the application has been violated while executing the workload in the virtual computing resource in a first virtual data center provisioned on a first computing system comprising a plurality of host computing devices, wherein the at least one of the policies defines, for the virtual computing resource while executing the workload of the application, at least one of a minimum number of processor cores for use by the virtual computing resource, a minimum amount of memory for use by the virtual computing resource, a minimum network speed for use by the virtual computing resource, a minimum input/output operations per second (TOPS) for use by the virtual computing resource, a maximum input/output (TO) latency for use by the virtual computing resource, or a security policy to be applied to the virtual computing resource while executing the workload of the application, and
responsive to said determining, programmatically performing steps including: (1) searching for a second virtual data center to which the virtual computing resource executing the workload can be migrated, (2) determining that, if the virtual computing resource executing the workload is migrated from the first virtual data center to the second virtual data center provisioned on a second computing system comprising a plurality of host computing devices, then all of the multiple policies defined for the application will be complied with, and (3) based on the determined ability to comply, migrating the virtual computing resource executing the workload from the first virtual data center to the second virtual data center.

20. The computer system of claim 19, wherein the processor is programmed to, during initial deployment of the application, programmatically performs steps including (1) searching for the first virtual data center in which the virtual computing resource that executes the workload can be deployed, (2) determining that, if the virtual computing resource that executes the workload is deployed in the first virtual data center, then all of the multiple policies defined for the application will be complied with, and (3) based on the determined ability to comply, deploying the virtual computing resource that executes the workload in the first virtual data center.

* * * * *

UNITED STATES PATENT AND TRADEMARK OFFICE
CERTIFICATE OF CORRECTION

PATENT NO. : 10,678,579 B2
APPLICATION NO. : 15/462654
DATED : June 9, 2020
INVENTOR(S) : Rawlinson Rivera et al.

Page 1 of 1

It is certified that error appears in the above-identified patent and that said Letters Patent is hereby corrected as shown below:

In the Specification

Column 6, Line 64: [[TOPS]]; should read IOPS
Column 6, Line 66: [[TOPS]]; should read IOPS In the Claims Column 11, Line 1: [[TO]]; should read IO
Column 11, Line 28: [[TOPS]]; should read IOPS
Column 12, Line 14: [[TO]]; should read IO
Column 12, Line 44: [[TOPS]]; should read IOPS
Column 14, Line 1: [[TOPS]]; should read IOPS
Column 14, Line 2: [[TO]]; should read IO Signed and Sealed this
Twenty-second Day of September, 2020

Andrei Iancu
*Director of the United States Patent and Trademark Office*